United States Patent [19]

Wickert

[11] Patent Number: 4,683,260

[45] Date of Patent: Jul. 28, 1987

[54] CLEAR TOPCOAT COATINGS FOR WOOD

[75] Inventor: Frank A. Wickert, Olmsted Township, Lorain County, Ohio

[73] Assignee: The Glidden Company, Cleveland, Ohio

[21] Appl. No.: 924,280

[22] Filed: Oct. 29, 1986

Related U.S. Application Data

[62] Division of Ser. No. 793,188, Oct. 31, 1985, abandoned.

[51] Int. Cl.$^4$ .............................................. C08J 31/00
[52] U.S. Cl. .................................. 524/512; 524/515; 524/522; 524/523
[58] Field of Search ............... 524/501, 515, 522, 524, 524/512, 523

[56] References Cited

U.S. PATENT DOCUMENTS

| | | | |
|---|---|---|---|
| 4,064,191 | 12/1977 | Parekh | 525/186 |
| 4,069,186 | 1/1977 | Ramig | 428/522 X |
| 4,265,969 | 5/1981 | Yasuda | 428/342 |
| 4,272,590 | 6/1981 | Blank | 427/393 X |
| 4,277,385 | 7/1981 | Carroll et al. | 523/221 |
| 4,301,210 | 11/1981 | Yasuda | 428/342 |
| 4,377,661 | 3/1983 | Wright | 524/522 |
| 4,419,465 | 12/1983 | Backhouse et al. | 524/522 X |

*Primary Examiner*—Thurman K. Page
*Attorney, Agent, or Firm*—Thomas M. Schmitz

[57] ABSTRACT

Clear topcoats for grain printed, paper overlay and wet print interior wood paneling comprising a low Tg acrylic latex emulsion polymer, a high Tg non-film forming plastic pigment latex emulsion and a glycoluril crosslinker in a solids ratio of 1:6 parts latex to 1 part crosslinker provide coatings of excellent block resistance and gloss retention adapted to cure at temperatures of from about 100° F. to 260° F.

2 Claims, No Drawings

CLEAR TOPCOAT COATINGS FOR WOOD

This is a divisional application of Ser. No. 793,188 filed Oct. 31, 1985 now abandoned.

BACKGROUND OF THE INVENTION

This invention relates to emulsion polymer based wood coatings and more particularly relates to a functional low Tg emulsion polymer in combination with a glycoluril derivative and a non-functional high Tg emulsion polymer to form a clear topcoat for plywood and hardboard interior paneling.

Clear topcoats for interior wood paneling have some rather stringent performance requirements which are extremely difficult to achieve in waterborne systems. These performance requirements include: clarity (no haziness or milkiness); block resistance (approximately 1 min. after topcoat is applied, panels are stacked face to face for shipping, and there can be no sticking of coated panels which are exposed to stack pressures as high as 120 psi); low temperature cure (clear topcoats must be capable of forming a film and curing in 20-30 sec. at F.B.S.T.'s of 165°-205° F.); variable gloss requirements are necessary for each wood species (therefore, the topcoat composition must provide some means for varying gloss); water resistance (the topcoat must *not* whiten or blister when exposed to high humidity or come directly in contact with water); tape release masking tape (e.g. Scotch brand #250 must be released by the substrate without damage to the finish); and stain resistance (the topcoat must not be damaged by several common household substances, e.g. detergent solutions, ammonia, solvents, lipstick, grape juice, nail polish remover, etc.).

Current coating compositions for wood coatings, particularly for interior wood paneling, are primarily solvent based wood coatings. Latex polymers are desirable waterborne binder systems for wood coatings, but are inadequate due to various characteristics of latexes. Block resistance is the most severe problem since the latex polymer must be soft enough to provide good cohesive film properties and yet be hard enough to resist sticking together of adjacent panels stacked one on top of the other for shipping or storage purposes. Since it is difficult to adjust the Tg of a latex polymer to obtain the proper balance of properties, the necessary filming properties are generally achieved at the expense of block resistance, and a product with unacceptable blocking properties is produced. It is known that a waterborne emulsion based clear coating with the proper balance of filming properties and block resistance is obtainable if the latex polymer composition contains a functional monomer that promotes crosslinking with an aminoplast resin. However, it has been our experience that a clear coating of this nature will not have the proper balance of properties at lauan plywood bake conditions unless the latex Tg is low enough to provide good coalescence at 165°-205° F., and the volume solids ratio of the crosslinking resin is greater than or equal to that of the latex polymer.

Even though the aforementioned coating composition has the desired balance of properties, it has not gained total acceptance by the paneling producers because of excessive costs and formaldehyde emissions. Since both of these coating parameters are directly proportional to the amount of aminoplast resin in the formulation, it becomes obvious that good filming properties and block resistance must be achieved at significantly reduced aminoplast resin content in order to satisfy all the desires of the paneling producers. As far as formaldehyde emissions are concerned, glycoluril crosslinkers are favored over urea or melamine formaldehyde types since they tend to generate significantly reduced levels of formaldehyde during the cure cycle.

It now has been found that highly desirable wood coatings can be produced based on a polymeric composition comprising a non-film forming high Tg emulsion polymer, sometimes referred to as plastic pigment, in combination with glycoluril and a low Tg emulsion polymer. The preferred composition comprises a reactive, low Tg polymer having reactive hydroxyl, carboxyl, or acrylamide groups adapted to be coreactive with glycoluril at relatively low temperatures in conjunction with a high Tg polymer, especially plastic pigment emulsions. Good cohesive film properties are achieved while maintaining superior block resistance comparable to commercial solvent based topcoats. These and other advantages of this invention will become more apparent by referring to the detailed description and illustrative examples.

U.S. Pat. Nos. 4,265,969 and 4,301,210 teach overcoating pigment with plastic pigment to improve surface gloss in coated paper.

Japanese Pat. No. JP 51/111277 (761001) teaches heat-sealing paper sheets by coating with a suspension of fine thermoplastic resin particles. Japanese Pat. No. JP 58/060091 (830409) teaches a pigment composition for coated paper where various pigments, including plastic pigment, is used with dextrose and emulsion copolymerized latex. Japanese Pat. No. 58/22974 (830721) teaches white ink composition for jet printing containing water-soluble resin, plastic pigment and water-soluble solvent. Japanese Pat. No. 58/054096 teaches a pigment composition (including plastic pigment) for coated paper in combination with an emulsion polymer latex. Japanese Pat. No. JP 58/046198 teaches an undercoating comprising various pigments including plastic pigment. Japanese Pat. No. JP 57/61193 (OJI) teaches paper coated with high solids (pigment dispersed in latex). U.S. Pat. Nos. 4,277,385 (810,707) and 4,283,320 (810,811) teach crack-free paints using an aqueous latex dispersion paint comprising 15-25 volume percent (dry solids basis) film-forming acrylic latex binders, 72-77% solid non-cellular, non-film forming polymer particles, and 3-8% opacified pigment of refractive index at 1.8. The binder has an average particle size of 0.1-0.5 microns and a Tg of at least 5° C. below the coalescent temperature. The polymer particles have an average size 0.05-0.8 microns and have Tg at least 30° C. above the Tg of the binder. None of the above patents teach how to develop block resistant thermoset clear coatings utilizing glycoluril crosslinking with plastic pigments.

Coassigned U.S. Pat. Nos. 4,283,320; 4,277,385; and 4,069,186, which relate generally to opaque coatings incorporating a variety of plastic pigments, are incorporated herein.

SUMMARY OF THE INVENTION

Briefly, a low Tg film forming emulsion polymer having a Tg less than 30° C. and comprising copolymerized ethylenically unsaturated monomers, preferably including minor amounts of reactive hydroxyl, carboxyl, or acrylamide monomer is combined with a glycouril derivative and a high Tg (>55° C.) non-film forming emulsion to provide an aqueous coating composition adapted to be cured into a hard film by application of moderate heat between about 40° C. and 100° C. to provide an excellent non-blocking coating.

The composition of this invention on a volume solids basis can contain between 15 and 50% glycoluril derivative and between 85 and 50% total emulsion latex polymer comprising a mixture of low Tg and high Tg polymer. The preferred composition on the same basis contains 25% glycoluril derivative, 75% latex mixture with 40% of the coating solids composition comprising a high Tg non-film forming emulsion polymer.

One aspect of the invention relates to a process for applying a coating to plywood paneling which comprises an acrylic latex emulsion polymer and a glycoluril crosslinking agent in a volume ratio of 1-6 parts latex to 1 part crosslinker and wherein said emulsion polymer has a Tg of from 0° C. to 30° C. and is adapted to cure with said crosslinking agent at elevated temperatures, the improvement which comprises replacing at least 40% of the resin solids by volume with a plastic pigment latex to provide a clear block-resistant coating to said plywood.

A further aspect relates to the process where a plywood substrate is coated according to the above process wherein the plastic pigment is a high Tg non-film forming aqueous latex emulsion of substantially polystyrene.

DETAILED DESCRIPTION OF THE INVENTION

This invention relates to improved aqueous latex emulsion coatings useful for clear topcoats for interior wood paneling and to a process for coating plywood panels such as grain printed, paper overlay or wet print panels. The improved coatings comprise 1-6 parts aqueous emulsion polymer per part of a crosslinking agent, preferably glycoluril crosslinkers, adapted to cure with emulsion polymer; the emulsion polymer consists of (1) an aqueous latex emulsion polymer having a Tg of less than 30° C. and preferably from about 20° C. to about 30° C. and having reactive functionality adapted to cure with the glycoluril crosslinking agent; and (2) a plastic pigment latex comprising at least 40 volume percent of the total resin solids.

Referring first to the latex emulsion (1) having a Tg of less than about 30° C., these polymers comprise copolymerized ethylenically unsaturated monomers and can include vinyl unsaturated monomers containing vinyl double bond unsaturation including, for example, vinyl esters such as vinyl acetate, vinyl proprionate, vinyl butyrates, vinyl benzoate, isopropenyl acetate and like vinyl esters; vinyl amides, such as acrylamide, and methacrylamide; and vinyl halides such as vinyl chloride. Ethylenically unsaturated monomers other than vinyl unsaturated monomers can include, for example, styrene, methyl styrenes and similar alkyl styrenes, chlorostyrene, vinyl voluene, vinyl naphthalene, divinyl benzene, diallyl phthalate, and similar diallyl derivatives, butadiene, alkyl esters of acrylic and methacrylic acid and similar ethylenically unsaturated monomers. Acrylic unsaturated monomers include lower alkyl esters of acrylic or methacrylic acid having an alkyl ester portion containing between 1 to 12 carbon atoms as well as aromatic derivatives of acrylic and methacrylic acid, and can include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate and various reaction products such as butyl, phenyl, and cresyl glycidyl ethers reacted with acrylic and methacrylic acids. Preferred polymers include reactive copolymerized monomers such as reactive monomers of acrylamide, carboxyl monomer, or hydroxyl monomer whereby the reactive groups are adapted to be coreactive and crosslinked with glycoluril. Preferable the polymers contain polymerized monomer by weight between 1% and 20% hydroxyl monomer, with the balance being other ethylenic monomers. The acrylamide monomers can be acrylamide, methacrylamide, ethylacrylamide, acrylonitrile, methacrylonitrile, and similar atoms alkyl acrylamide and methacrylamide monomers; N-alkanol amide monomers including for example, N-methylol acrylamide, N-ethanol acrylamide, N-propanol acrylamide, N-methylol methacrylamide, N-ethanol methacrylamide, and similar acrylamides and methacrylamide. Carboxyl containing monomers are ethylenically unsaturated monomers containing carboxyl group such as acrylic, methacrylic or ethacrylic acid, as well as itaconic, citriconic, fumaric, maleic, measonic and aconitic acids. The preferred acids are acrylic and methacrylic acids. Hydroxyl containing monomers ethylenically unsaturated monomers containing a hydroxyl and can include for example, hydroxy alkyl acrylates or methacrylates such as hydroxyethyl, hydroxypropyl, hydroxybutyl, hydroxyhexyl, hydroxyoctyl, and similar lower alkyl hydroxyl acrylates and methacrylates. The ethylenically unsaturated monomers can be copolymerized by free radical induced addition polymerization using peroxy or azo catalysts, common redoc catalysts, ultraviolet radiation, or the like.

Referring now more specifically to the differences between the high Tg polymer and the low Tg polymer, the glass transition temperature (Tg) for the high Tg polymer should be above about 55° C. and the low Tg polymer should have a Tg less than 30° C. Hard monomers imparting a higher Tg include styrene, methylmethacrylate and substituted styrenes whereas soft monomers include lower alkyl acrylates such as methyl, ethyl, propyl, and butyl acrylates. The term "glass transition temperature" is a term well known in the art and generally defines the onset of long-range molecular motion wherein the polymer preserves the outward appearance of a solid but becomes rubbery and then tacky with increasing temperature and undergoes plastic flow and elastic deformation. A polymer particle having a glass transition temperature greater than room temperature will be a non-film former at room temperature. The glass transition temperature can be measured in accordance with 41 Journal of Paint Technology, pages 167-169 (1969). The Tg can be calculated with the Fox equation (Fox equation is $1/Tg = EW_i/Ti$) are estimated by testing for a Vicat softening point as set forth in ASTM 1525. Both the high Tg and low Tg polymer particles have a weighted average particle diameter between about 1,000 Å and 10,000 Å (0.1 to 1.0 microns).

In accordance with this invention, the high Tg non-film forming emulsion polymer particles are linear polymers produced by copolymerizing monoethylenically unsaturated monomers with minor amounts of difunctional or multifunctional monomers. Divinyl benzene, for example, has an ethylenic unsaturation functionality of two and a crosslinking site of one since the other double bond is considered copolymerized in the polymer chain. For definition purposes, the crosslink density of the polymer is the number of equivalent crosslinking sites in a gram mole of multifunctional monomer per kilogram of polymer. A polymer containing 10 grams of divinyl benzene copolymerized with 990 grams of monofunctional monomer (styrene), for example, has 10/130 crosslinking sites or a crosslinking density of 0.0769 equivalent crosslinking sites per kilogram of polymer. On a weight percentage basis, the polymer particles generally contain between 0.1% to 10% crosslinking or difunctional monomer. Suitable difunctional crosslinking vinyl monomers include, for example, diallyl phthalate, divinyl benzene, divinyl ether, neopentyl glycol diacrylate, diallyl phenyl phosphonate, diallyl isopropylidene, and 1.6 hexane diacrylate and similar diacrylates as well as other difunctional vinyl monomers having reactive difunctional ethylenic unsaturation capable of crosslinking other ethylenically unsaturated vinyl monomers. Other high Tg polymers may be used including latex polymers prepared by methods other than emulsion polymerization.

Preferred high Tg non-film forming emulsion polymers are sometimes referred to as "plastic pigments". The non-film forming particles are preferably polystyrene, but can be polymers and copolymers of other ethylenically unsaturated monomers such as disclosed in U.S. Pat. No. 3,423,351 provided the Tg of the particles are sufficient and do not coalesce at the ambient application and mild curing temperatures. The non-film forming polymer particles can be copolymerized ethylenically unsaturated monomers having a carbon-to-carbon ethylenic double bond unsaturation capable of addition polymerization through the ethylenic double bond and can include, for example, styrene, substituted styrenes, vinyl chloride, vinylidene chloride, acrylonitrile, methacrylonitrile, esters of acrylic and methacrylic acid and tertiary butyl acrylate wherein the polymers or copolymers thereof having a Tg greater than about 30° C. Preferred polymer particles are polystyrene, polyvinyl chloride, and polymethyl methacrylate, as further illustrated in the examples.

Plastic pigment particles are further disclosed in U.S. Pat. No. 4,069,186; U.S. Pat. No. 4,277,385; and U.S. Pat. No. 4,283,320 which, together with U.S. Pat. No. 3,423,351, are incorporated herein by reference.

Especially preferred are styrene emulsion polymers containing a minor amount of methacrylic acid as disclosed in U.S. Pat. No. 4,283,320. Other useful non-film forming high Tg emulsion latex polymer can contain copolymerized monomers and optionally very minor amounts of acrylamide, methacrylamide, N-methylol acrylamide, hydroxyalkyl monomer and major amounts of other ethylenically unsaturated non-film forming monomers.

The coating composition of this invention for application to wood and plywood paneling comprises on a solids volume basis:

(A) 1 to 6 parts by volume (solids) of an aqueous emulsion consisting of a mixture of
 (1) a film forming aqueous acrylic polymer latex having a Tg of less than 30° C. and preferably from about 20° C. to about 30° C. adapted to cure with a glycoluril crosslinking agent under baking conditions of from about 100° C. to 260° C.; and
 (2) a non-film forming plastic pigment emulsion latex present in the mixture in an amount at least 40 volume percent resin solids basis and derived by the aqueous emulsion polymerization of ethylenically unsaturated monomer optionally containing up to 2 weight percent (basis monomer solids) of copolymerized acid monomer selected from acrylic or methacrylic acid.

(B) 1 part glycoluril crosslinking agent.

A preferred composition contains between 90 and 315 weight parts of glycoluril derivative, between 299 and 361 weight parts of the latex mixture, comprising from about 160 to about 170 weight parts of the high Tg non-film forming emulsion polymer.

In practice, the high Tg emulsion polymer and the low Tg emulsion polymer are synthesized separately although by similar processes but using different combinations of monomers to obtain the proper Tg polymer particle. In either process, the ethylenic monomers can be polymerized in an aqueous medium at a pH preferably between about 1.0 and 6. Generally, the polymerization is conducted at a temperature of about 20°–100° C. in the presence of a free radical generating catalyst. Commonly used free radical initiators include various peroxygen compounds such as the persulfates, benzoyl peroxide, t-butyl hydroperoxide, cumene hydroperoxide, t-butyl diperphthalate, pelargonyl peroxide and 1-hydroxycyclohexyl hydroperoxide; azo compounds such as azodiisobutyronitrile and dimethylazodiisobutyrate; and the like. Particularly preferred as polymerization initiators are the water-soluble peroxygen compounds such as hydrogen peroxide and the sodium, potassium and ammonium persulfates used by themselves or in activated "redox" type systems. Typical "redox" systems include alkali metal persulfates with: A reducing substance such as a polyhydroxy phenol and oxidizable sulfur compound such as sodium sulfite or sodium bisulfite, a reducing sugar, dimethylamino propionitrile, a diazomercapto compound and a ferricyanide compound, and the like. The amount of initiator used will generally be in the range between about 0.1 to 3% by weight based on the monomers and preferably is maintained between 0.15 and 0.8% by weight. Usually the initiator will all be charged at the outset of the polymerization; however, incremental addition or proportioning of the initiator is often employed.

When an emulsifier is used to prepare the latices of this invention, they are the general types of anionic and non-ionic emulsifiers. Exemplary anionic emulsifiers which may be employed are: alkali metal or ammonium salts of the sulfates of alcohols having from 8 to 18 carbon atoms, such as sodium lauryl sulfate, ethanolamine lauryl sulfate, ethylamide lauryl sulfate; alkali metal and ammonium salts of sulfonated petroleum or paraffin oils; sodium salts of aromatic sulfonic acids, such as dodecane-1-sulfonic acid and octadiene-1-sulfonic acid; aralkylsulfonates such as sodium isopropyl benzene sulfonate, sodium dodecyl benzene sulfonate, and sodium isobutyl naphthalene sulfonate; alkali metal and ammonium salts of sulfonated dicarboxylic acid esters such as sodium dioctyl sulfosuccinate, disodium N-octadecylsulfosuccinamate; alkali metal or ammonium salts of free acids of complex organic mono- and diphosphate esters and the like. So-called non-ionic emulsifiers such as octyl- or nonylphenyl polyethoxyethanol and the like may also be used. The amount of emulsifier used may be from about 0.01 to 6% or more by weight of the monomers. All the emulsifiers may be added at the beginning of the polymerization or it may be added incrementally or by proportioning throughout the run. Typical polymerizations for the preparation of the high Tg emulsion polymers or low Tg emulsion polymers of this invention are conducted by charging the monomers into the polymerization reactor which contains water and a portion of the emulsifying agent. The reactor and its contents are heated and the initiator added.

Thermosetting compositions can be produced where high Tg and low Tg emulsion polymers contain reactive hydroxyl, carboxyl, or acrylamide groups adapted to be crosslinked by reaction with a glycoluril derivative. Glycoluril derivatives are disclosed in U.S. Pat. No. 4,604,191 and are also known as acetylendiureas. Glycolurils are derived by reacting two moles of urea with one mole of glyoxal to provide a complex ring structure illustrated as follows:

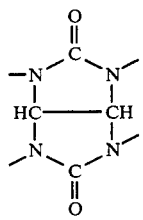

The substitute constituents can be a hydrogen, or a lower alkyl radical, or can be methylolated partially or fully by reacting 1 to 4 moles of formaldehyde to provide a methylol glycoluril. The preparation of various glycolurils are illustrated in U.S. Pat. No. 4,064,191 such as tetramethylol glycoluril, tetrabutoxymethyl glycoluril, partially methyolated glycoluril, tetramethyoxymethyl glycoluril, and dimethoxydiethoxy glycoluril. Useful glycoluril derivatives include for example, mono- and dimethylether or dimethylol glycoluril, the trimethylether of tetramethylol glycoluril, the tetramethylether of tetramethylol glycoluril, tetrakisethoxymethyl glycoluril, tetrakisopropoxmethyl glycoluril, tetrakisbutoxymethyl glycoluril, tetrakisamyloxymethyl glycoluril, tetrakishexoxymethyl glycoluril and the like. Further glycoluril derivatives include dimethylol dihydroxy ethylene urea which is believed to have the following chemical structure:

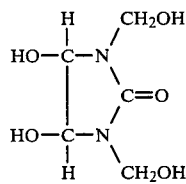

This invention contemplates the use of various crosslinking compositions that effect cure by reaction with the functional group moieties of the low Tg latex. Such crosslinkers include the aminoplast, melamine, urea formaldehyde and glycoluril cure catalysts. The glycoluril cure catalysts are especially preferred such as Cymel 1172 and Cymel 1175 exemplified in coassigned U.S. Pat. No. 4,444,941 and U.S. Pat. No. 4,442,257 incorporated herein by reference.

Thermosetting compositions of this invention comprise on a polymer volume basis at least about 40% high Tg emulsion polymer with the remaining reactive low Tg film forming latex and glycoluril derivatives. Minor amounts of other latex or water dispersed polymer can be added if desired. The thermosetting compositions cure quickly at low temperatures under acidic curing conditions. Acid catalysts, such as p-toluene sulfonic acid (3 to 5 percent by weight crosslinker solids), are useful for accelerating the cure. The thermosetting composition can be used as a clear coating or as a pigmented coating.

The merits of this invention are further illustrated in the following examples. These examples should not be read in a restrictive manner. Unless otherwise indicated, temperatures are given in degrees Fahrenheit and percentages are expressed as weight percentages.

EXAMPLE 1

(a) Latex

An emulsion polymer was produced from the following components:

|  | Grams |
|---|---|
| deionized water | 85.6 |
| sodium dihexyl sulfosuccinate | 0.5 |
| potassium carbonate | 0.136 |
| ammonium persulfate | 0.273 |
| sodium bis-tridecyl suffosuccinate | 0.319 |
| butyl acrylate | 39.0 |
| methyl methacrylate | 39.0 |
| N—isobutoxymethyl acrylamide | 12.0 |
| 2-hydroxyethyl acrylate | 6.0 |
| glacial methacrylic acid | 4.0 |
| sodium formaldehyde sulfoxylate | 0.180 |
| tertiary butyl hydroperoxide | 0.012 |

The emulsion polymer is prepared as follows. The monomers are polymerized in a conventional reactor using a standard procedure of metering in the main body of monomer into the heated water plus surfactant and potassium carbonate over a 2- to 5-hour interval. Batch loading of monomer is possible, but not preferred. Changing the monomer composition during the feed is also possible and may lead to faster cure and/or cleaner batches. The reactor is run at 60°–86° C. The sodium formaldehyde sulfoxylate and t-butyl hydroperoxide are added after the main body of monomers have been polymerized in order that traces of free monomers are reacted.

The film forming emulsion polymer latex is particularly suitable as a binder system for a paint composition. The latex polymer has a Tg of 20° C.

(b) Plastic Pigment (High Tg)

Plastic pigment latex emulsion was prepared generally as set forth in U.S. Pat. No. 4,069,186 and other patents noted above. The non-film forming polymer particles have a weighted average particle diameter between 0.1 and 1.0 microns, advantageously between 1,000 Å to 8,000 Å and preferably between 1,000 Å to 6,000 Å.

(c) Paint Composition

The foregoing latex (a) can be utilized to produce a useful paint composition which can be applied to a substrate and cured at low temperatures such as 10 minutes at 120° F., or an oven bake and/or infrared heat to achieve a substrate surface temperature of from about 100° F. to about 260° F. A typical paint composition is as follows:

EXAMPLE 2

A clear topcoat coating was prepared by combining the following ingredients in the proportion indicated.

|  | Lbs. | Gal. |
| --- | --- | --- |
| Latex (a) (20° C. Tg) | 289.4 | 32.26 |
| Non-Ionic Surfactant | 3.0 | .36 |
| T.M.G.U. (75% N.V.)* | 210.26 | 18.11 |
| Latex (b) (100° C. Tg) | 354.60 | 41.33 |
| Organosilicone Slip-aid | 9.0 | 1.02 |
| Carnuba Wax Emulsion | 25.0 | 3.00 |
| Silicone Slip-aid | 3.0 | .37 |
| Defoamer | 3.0 | .40 |
| Hydroxy Methyl Cellulose 10% solution | 26.24 | 3.15 |
|  | ** | ** |

*(Tetramethylol glycoluril)
**Total Lbs.-923.50 Total Gal.-100.00

The performance characteristics of the topcoat were observed over Champion paper overlay lauan plywood substrate. The following results were recorded:

| #250 Masking Tape Release | 100% Release |
| --- | --- |
| 60° Gloss | 28.9% |
| MEK Resistance (double rubs) | 16 |
| Block Resistance @ 65° C.-120 PSI | No sticking |

EXAMPLES 3-10

Topcoats were prepared essentially as indicated in Example 2 with the exception that the ingredients were varied as follows:

| Example | Latex (a) (%) | Latex (b) (%) | Glycoluril* (%) | 60° Gloss (%) | Clarity | Block Resistance |
| --- | --- | --- | --- | --- | --- | --- |
| 3 | 54 | 0 | 46 | 44.0 | Clear | Poor |
| 4 | 48.57 | 10 | 41.43 | 40.0 | Clear | Poor |
| 5 | 43.14 | 20 | 36.86 | 35.8 | Clear | Fair |
| 6 | 37.71 | 30 | 32.29 | 26.3 | Clear | Fair-Good |
| 7 | 32.28 | 40 | 27.72 | 18.6 | Clear | Excellent |
| 8 | 26.85 | 50 | 23.15 | 18.7 | Sl. Haze | Excellent |
| 9 | 21.42 | 60 | 18.58 | 12.3 | Cloudy | Excellent |
| 10 | 16 | 70 | 14 | 16.8 | Opaque | Excellent |

*Tetramethylol glycoluril

As seen in the above table a clear film with excellent block resistance is obtained when 40% of the total polymer solids by volume is non-film forming latex emulsion polymer.

The foregoing description and illustrative examples demonstrate the merits of an excellent wood coating comprising high Tg reactive emulsion polymer and coreactive glycoluril, but are not intended to be limiting except by the appended claims.

What is claimed is:

1. A clear coating composition for application to wood and plywood paneling which comprises:
   (A) 1 to 6 parts by volume (solids) of an aqueous emulsion consisting of a mixture of
      (1) a film forming aqueous acrylic polymer latex having a Tg of from about 0° C. to about 30° C. having reactive functionality adapted to cure with a crosslinking agent under baking conditions of from about 100° F. to about 260° F.; and
      (2) a non-film forming plastic pigment emulsion latex having a Tg greater than about 55° C. and present in the mixture in an amount at least 40 volume percent basis polymer solids and derived by the aqueous emulsion polymerization of ethylenically unsaturated monomer optionally containing up to 2 weight percent (basis monomer solids) of copolymerized acid monomer selected from acrylic or methacrylic acid.
   (B) 1 part glycoluril crosslinking agent.

2. The composition of claim 1 wherein the crosslinking agent is a tetramethylol glycoluril and the plastic pigment is a polystyrene.

* * * * *